United States Patent [19]
Barazani et al.

[11] Patent Number: 5,709,508
[45] Date of Patent: Jan. 20, 1998

[54] CUTTING TOOL ASSEMBLY HAVING AN EXCHANGEABLE ADAPTOR WITH OFFSET THROUGH BORE AXES

[75] Inventors: Gideon Barazani, Kiryat Bialik; Jacob Friedman, Kfar Vradim, both of Israel

[73] Assignee: Iscar, Ltd., Midgal Tefen, Israel

[21] Appl. No.: 546,463

[22] Filed: Oct. 20, 1995

[30] Foreign Application Priority Data

Oct. 23, 1994 [IL] Israel .................................... 111370

[51] Int. Cl.$^6$ .................................................. B23B 27/04
[52] U.S. Cl. ..................... 407/101; 407/112; 407/118
[58] Field of Search ........................ 407/11, 101, 110, 407/104, 105, 112, 118

[56] References Cited

U.S. PATENT DOCUMENTS

| | | |
|---|---|---|
| 3,686,729 | 8/1972 | Cochran . |
| 3,864,882 | 2/1975 | Stein . |
| 4,332,513 | 6/1982 | Gowanlock ........................ 407/101 |
| 4,695,208 | 9/1987 | Yankoff ............................. 407/106 |
| 4,744,703 | 5/1988 | Cochran ............................ 407/45 |
| 4,938,641 | 7/1990 | Maier ................................ 407/110 |
| 4,940,369 | 7/1990 | Aebi et al. ........................ 407/42 |
| 4,992,007 | 2/1991 | Satran .............................. 407/110 |
| 5,112,163 | 5/1992 | Veilleux ............................ 407/101 |
| 5,112,164 | 5/1992 | Pano ................................. 407/110 |

Primary Examiner—Daniel W. Howell
Assistant Examiner—Kenneth J. Hansen
Attorney, Agent, or Firm—Pennie and Edmonds, LLP

[57] ABSTRACT

A cutting tool assembly comprising an elongated tool shank having, at a side adjacent a leading end thereof, a shank holding portion and an exchangeable adaptor having an insert retaining portion for retaining a replaceable cutting insert and an adaptor mounting portion releasably scoured to the shank holding portion by two clamping screws. The clamping screws are inserted into respective adaptor through bores formed in the adaptor mounting portion and threaded bores formed in the shank holding portion, the threaded bores being substantially aligned with the respective adaptor through bores. One of the adaptor mounting and shank holding portions is formed with a recess and the other one is formed with a protrusion mating with the recess and received therein, the bores passing through the recess and the protrusion and being oriented transversely to an axis of relative rotation of a workpiece with respect to the tool. The axes of the threaded bores are located substantially in a reference plane of the tool assembly which plane passes, during operation of the tool, through the axis of rotation. The axes of the through bores are slightly offset with respect to axes of the respective threaded bores so that they are disposed closer to the insert retaining portion than the axes of the threaded bores and, preferably, on different sides with respect to the reference plane of the tool assembly.

13 Claims, 5 Drawing Sheets

5,709,508

CUTTING TOOL ASSEMBLY HAVING AN EXCHANGEABLE ADAPTOR WITH OFFSET THROUGH BORE AXES

FIELD OF THE INVENTION

The present invention relates to a cutting tool assembly consisting of a tool shank and an exchangeable adaptor for holding a replaceable cutting insert, releasably secured thereto, for use in different cutting operations, in particular, in internal operations such as turning, parting, grooving, especially face grooving, trepanning, etc.

BACKGROUND OF THE INVENTION

In a typical cutting tool assembly of the above kind, an adaptor holding a cutting insert usually has an adaptor mounting portion which is attached to a shank holding portion of an elongated tool shank by means of clamping screws and a planar or arcuate insert retaining portion projecting outwardly from the adaptor mounting portion so that the extent of the projection of the insert retaining portion defines the cutting depth of the operation.

Such cutting tools are disclosed, for example, in U.S. Pat. No. 4,332,513 and in U.S. Pat. No. 5,112,164. In these patents, a cutting insert is held in an insert retaining portion by means of an either replaceable or resilient clamping arm. The cutting tools of both disclosures are not suitable for face grooving operations at relatively large depths, seeing that, due to strength limitations and possible vibration problems, the insert retaining portions thereof are not designed to protrude sufficiently with respect to the adaptor mounting portion.

In a cutting tool assembly disclosed in WO 94/21408 as well as in a cutting tool assembly manufactured by Plansee and known as "TIZIT Maxilock MSS", an adaptor has an essentially protruding insert retaining portion enabling the use of the cutting tool for relatively deep grooving operations. However, due to a specific design of a shank holding portion to which the adaptor is attached and a specific manner of the attachment, the assembly has a large number of components and a predetermined strict sequence of mounting operations.

In all the cutting tool assemblies described above, both the number and the disposition of clamping screws used for coupling an adaptor to a tool shank require sufficient transverse dimensions of the assemblies, due to which none of these cutting tools can be used for internal machining of grooves within narrow holes in workpieces, i.e. when not only an insert retaining portion of the adaptor but the entire adaptor together with a shank holding portion need to enter the workpiece. It is therefore believed that, in such kind of operations, there have, until now, only been used tools of an integral construction rather than tool assemblies comprising exchangeable adaptors.

It is accordingly the object of the present invention to provide a cutting tool having an exchangeable adaptor, enabling accurate and efficient internal machining of grooves, in particular deep and narrow grooves, within workpieces having small diameters.

SUMMARY OF THE INVENTION

In accordance with the present invention there is provided a cutting tool assembly comprising an elongated tool shank having, at a side adjacent a leading end thereof, a shank holding portion and an exchangeable adaptor having an insert retaining portion for retaining a replaceable cutting insert and an adaptor mounting portion releasably secured to the shank holding portion by at least two clamping screws, the tool assembly having a reference plane passing, during operation of the tool. Through a cutting edge of said insert and through an axis of relative rotation of the workpiece with respect to the tool;

one of the adaptor mounting and shank holding portions being formed with a recess and the other one being formed with a protrusion mating with the recess and received therein;

said adaptor mounting portion being formed with at least two adaptor through bores and said shank holding portion being formed with at least two threaded bores substantially aligned with the respective adaptor through bores, the bores being oriented transversely with respect to said axis of rotation and passing through the recess and the protrusion, the axes of the through bores being slightly offset with respect to the axes of the respective threaded bores and being disposed closer to the insert retaining portion than the axes of the threaded bores, each clamping screw being inserted into the respective adaptor through bore and threaded bore of the shank holding portion and having a screw head portion received within said through bore and a screw threaded portion screwed into said threaded bore; the axes of said threaded bores being located substantially in said reference plane.

With such a design due to which the clamping screws are located substantially in the reference plane of the tool, during an internal cutting operation, all the clamping elements of the assembly and, in particular, the clamping screws are disposed substantially in the area of a workpiece where maximal space is available therefor. In consequence with this, the adaptor does not need to have an unduly increased traverse dimension, enabling thereby an essential miniaturization of the cutting tool. This is specifically important for deep internal operations in which it is desired that not only the insert retaining portion of the adaptor but also the adaptor mounting portion together with the shank holding portion enter a workpiece having small internal dimensions.

In a preferred embodiment of the present invention, the tool assembly comprises only two clamping screws, one of which screws being located closer to the insert retaining portion than the other one, the respective through bores and threaded bores being located accordingly.

Preferably, the axis of the through bore which is disposed adjacent the insert retaining portion is located slightly above said reference plane, as seen in the direction of a side view of the tool. In addition, it is preferable that the axis of the through bore which is disposed adjacent a terminal end of the adaptor is located slightly below said reference plane. It is desirable, in this case, that a dimension of the recess in the direction perpendicular to the reference plane is greater than a respective dimension of the projection.

Due to the fact that the axes of the through bores are disposed on different sides with respect to said reference plane, it is ensured that, upon screw coupling of the screws into said threaded bores, the adaptor mounting portion and consequently the adaptor is slightly rotated, providing thereby that the recess walls contact the protrusion walls at predetermined locations. One of these locations which is adjacent the insert retaining portion is disposed above the reference plane, if seen in the direction of the side view of the tool, while the other one which is adjacent the terminal end of the adaptor is located, preferably, below the reference plane, due to which a desired distribution of forces, during cutting operation, is ensured.

3

Preferably, the axes of the bores are substantially normal to said longitudinal axis of relative rotation of the workpiece with respect to the tool. However, they may also be slanted with respect to said longitudinal axis either in the same or in different senses.

In the preferred embodiment of the present invention, the tool shank is of an elongated generally cylindrical shape and a longitudinal axis of the tool shank lies in said reference plane. Consequently, the clamping screws in this tool according to the present invention are disposed in an area of the assembly where a bulk of material is maximal so that the screws do not require an unduly increased transverse dimension of the adaptor. This allows for a still more essential miniaturization of the cutting tool which is specifically advantageous for the internal curing operations of the kind specified above. Furthermore, due to the symmetrical design of the shank holding portion with respect to the reference plane, the same shank can be used for both right-hand and left-hand adaptors.

Preferably, the adaptor is of a substantially arcuate shape and has a dimension in the direction perpendicular to the reference plane, not exceeding corresponding dimension of the cylindrical tool shank, rendering thereby the cutting tool assembly suitable for internal machining within a narrow hole in a workpiece. With the design according to the present invention, the cutting tool can enter such a narrow hole of a depth which is substantially greater than conventional depths, and this in spite of the existence of the adaptor.

Preferably, the adaptor mounting portion is formed with an adaptor coolant fluid bore extending substantially along the length of the adaptor between a fluid inlet orifice disposed adjacent an adaptor terminal portion and a fluid outlet orifice disposed at a leading end of the adaptor mounting portion above the insert retaining portion so as to direct coolant fluid to the vicinity of the cutting edge. The fluid inlet orifice is preferably connected to a coolant fluid arrangement in the tool shank, adapted to be in fluid communication with a coolant fluid supply means. The coolant fluid duct arrangement of the tool shank, preferably, comprises a coolant fluid axial bore extending along the tool shank and terminating at a coolant fluid transverse bore located in said tool shank holding portion in a region thereof between said rear end of the holding portion and said at least one threaded bore. The coolant fluid transverse bore has at least one outlet portion which is aligned with said fluid inlet orifice of the adaptor.

Preferably, the coolant fluid transverse bore has two outlet portions disposed on two sides of said reference plane of the tool, which two outlet portions are operated alternatively depending on whether the tool shank is to be used with a left-hand or a right-hand adaptor.

4

Figure 2:
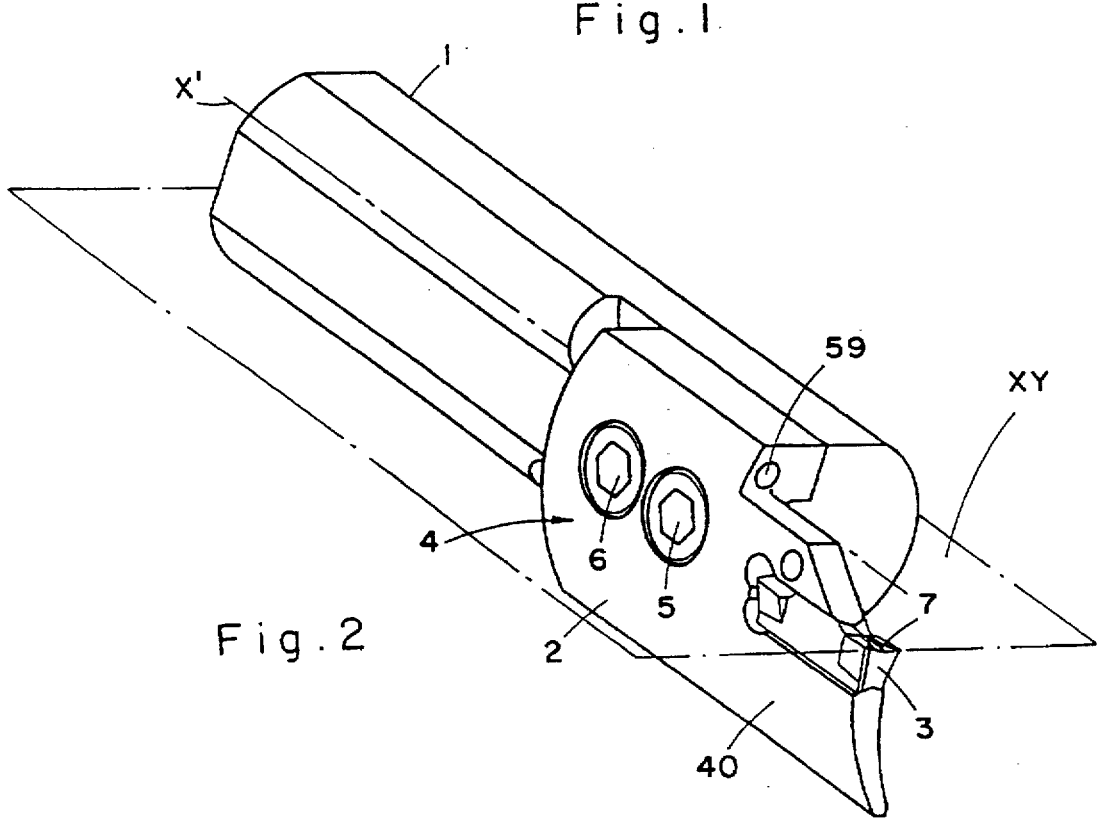
FIG. 2 is an isometric view of the cutting tool assembly shown in FIG. 1.
Figure 7:
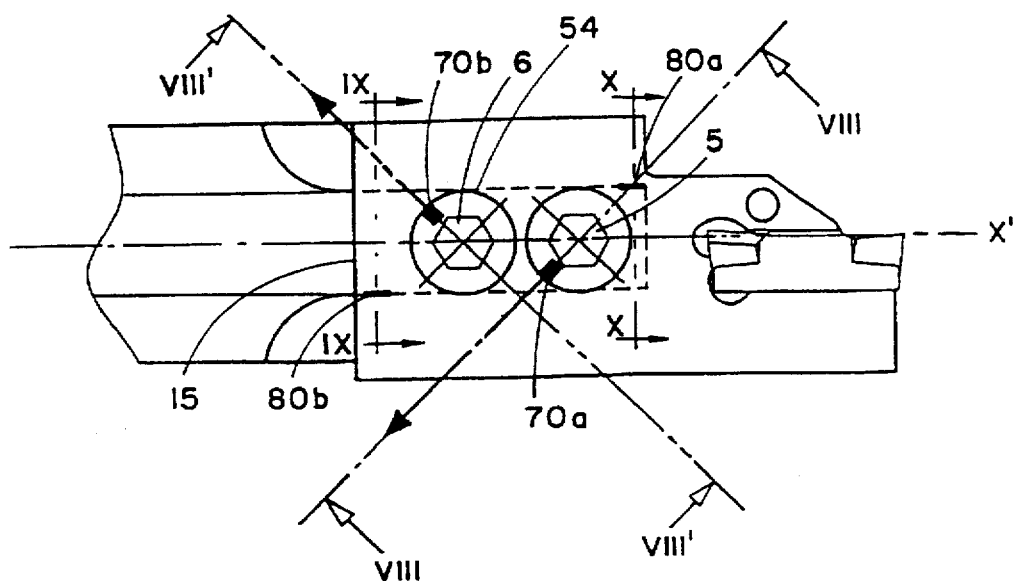
Figure 8:
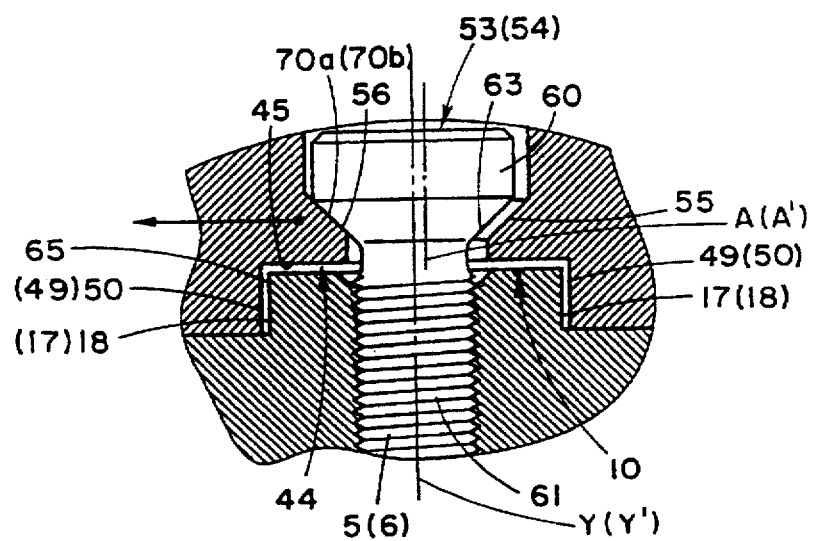
Figure 9:
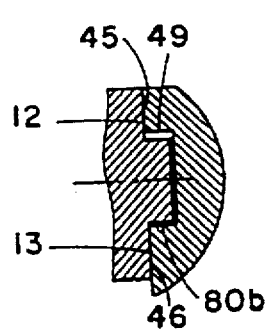
Figure 10:
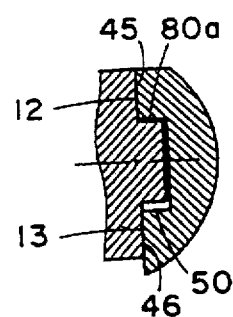
Figure 11:
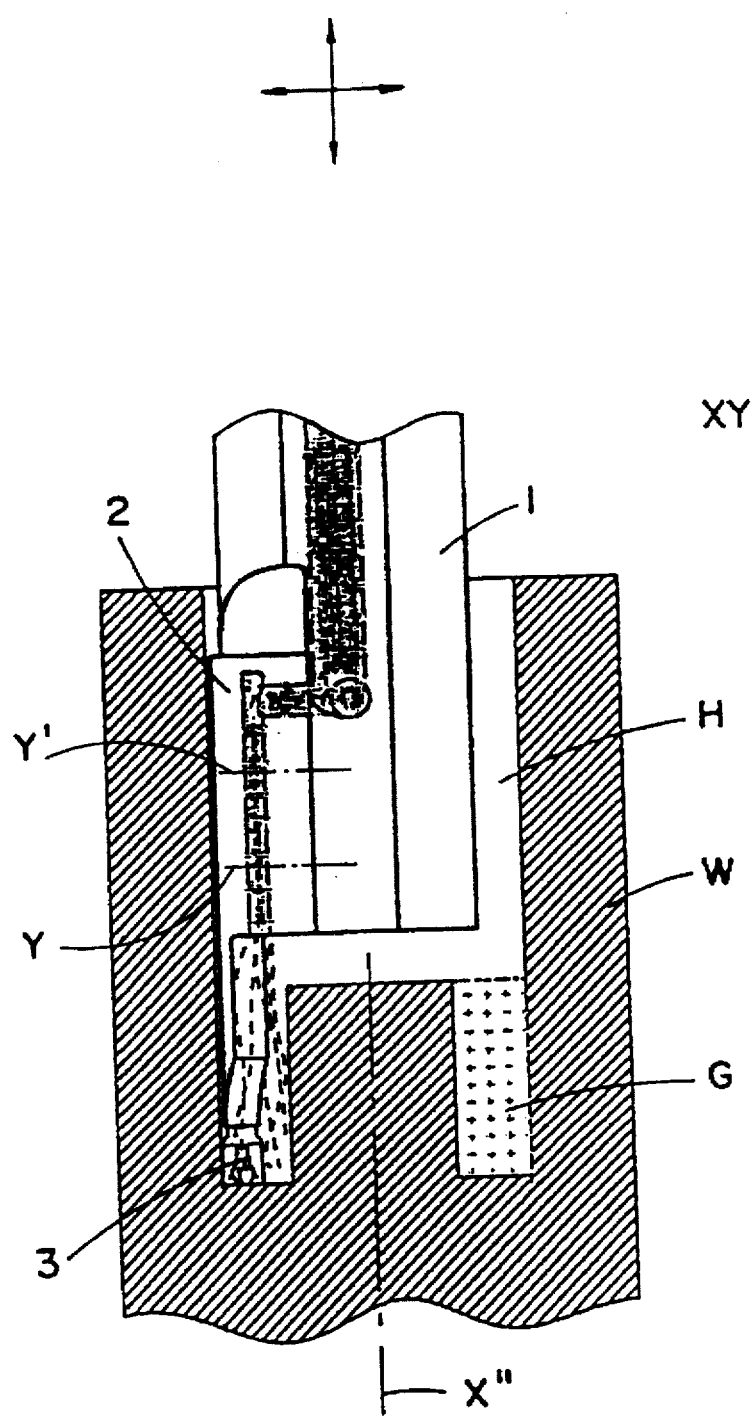
Figure 12:
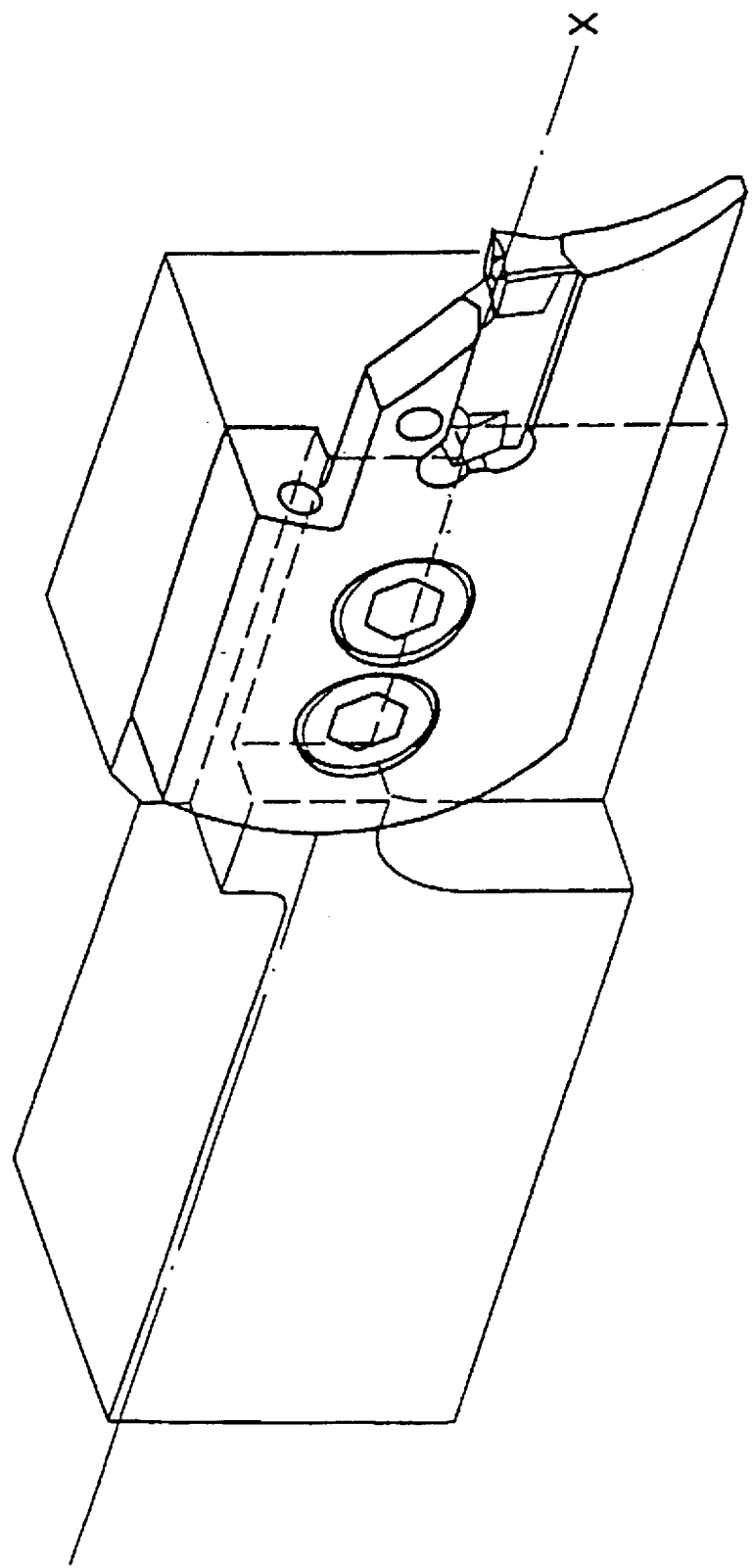

FIG. 7 is a side view of the cutting tool assembly shown in FIG. 2, schematically illustrating a clamping mechanism thereof;

FIG. 8 is a cross-sectional view along the lines VIII—VIII and VIII'—VIII' of the cutting tool assembly shown in FIG. 7, taken in position prior to final stage of clamping;

FIG. 9 is a cross-sectional view along the line IX—IX of the cutting tool assembly shown in FIG. 7;

FIG. 10 is a cross-sectional view along the line X—X of the cutting tool assembly shown in FIG. 7;

FIG. 11 is a cross-sectional view in a reference plane XY, schematically illustrates a disposition of the cutting tool assembly shown in FIG. 2 in a workpiece during a face grooving operation; and FIG. 12 shows an alternative embodiment of a cutting tool according to the present invention.

DESCRIPTION OF PREFERRED EMBODIMENTS

Figure 1:
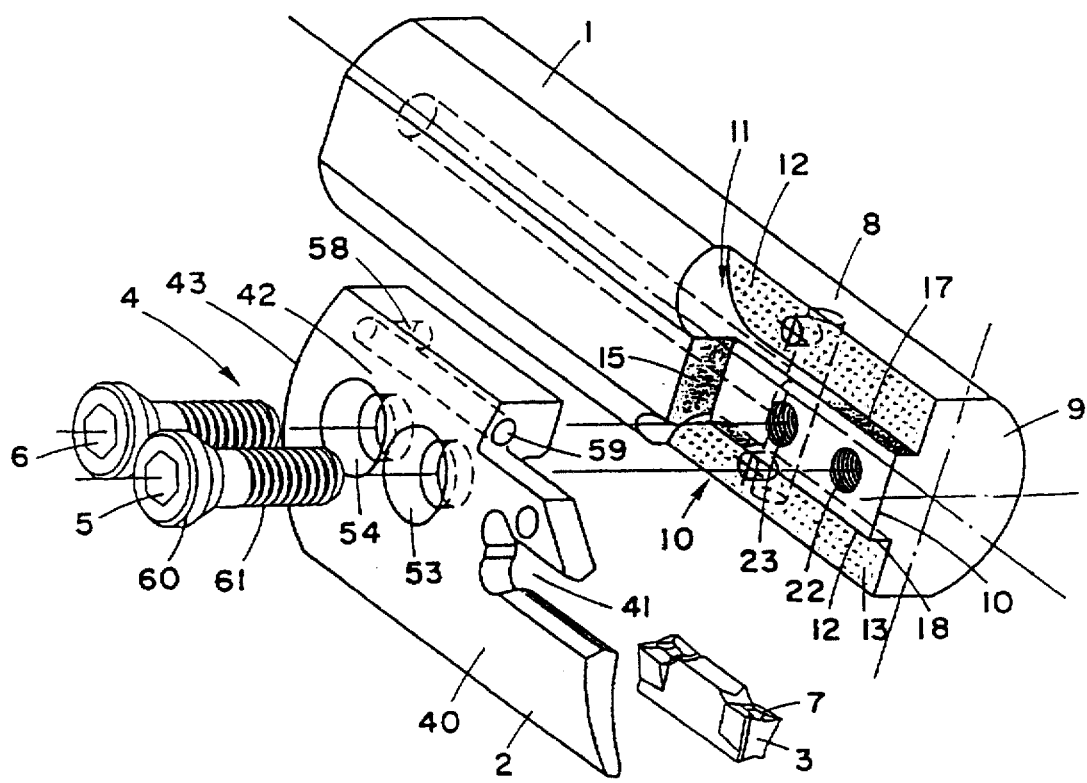
FIG. 1 is an exploded isometric view of a metal cutting tool assembly according to the present invention.
Figure 3:
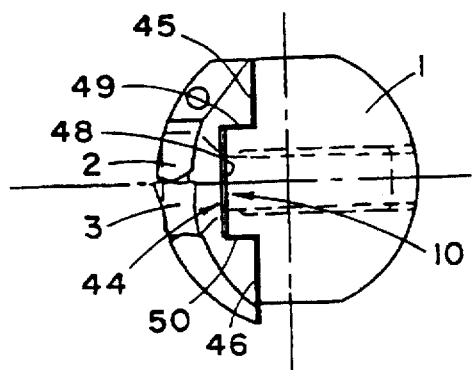
FIG. 3 is a front view of the cutting tool assembly shown in FIG. 2.

FIGS. 1, 2 and 3 show a cutting tool assembly according to the present invention. As seen in FIGS. 1 and 2, the cutting tool assembly comprises an elongated generally cylindrical tool shank 1 having a longitudinal axis X', a substantially elongated adaptor 2 holding a cutting insert 3, which is preferably a self-held indexable cutting insert, and a screw means, generally designated with 4, including two clamping screws 5 and 6 for clamping the adaptor 2 to the tool shank 1.

The cutting tool is adapted for use for internal machining, in particular and as shown in FIG. 11, for machining of a deep annular groove G within a relatively deep and narrow hole H in a workpiece W having an axis of rotation X". During the operation, the longitudinal axis X' of the tool shank is parallel to or coincides with the axis of rotation X". The assembly has a reference plane XY (the plane of FIG. 11) which passes through the axis of rotation X" of the workpiece W and which is generally parallel to a plan view of the tool. As schematically shown in FIG. 2, in the described embodiment, the longitudinal rotary axis X' of the tool shank 1 as well as a cutting edge 7 of the cutting insert 3 lie in the reference plane XY. However, they may be disposed in a different manner. For example, the cutting edge 7 may be located above the reference plane.

As seen in FIG. 1, the tool shank 1 has a shank holding portion 8 formed at a side of the tool shank adjacent a leading end 9 thereof. The shank holding portion 8 has a central rectangular axially directed elongated protrusion 10 and axially directed abutment surfaces 12 and 13 on either side of the profusion 10. The latter together with the abutment surfaces 12 and 13 extend from the leading end 9 of the tool shank to a rear end 11 of the shank holding portion 8 and are disposed substantially symmetrically with respect to the reference plane, being oriented substantially normally thereto. The shank holding portion 8 has an additional abutment surface 15 oriented radially and disposed adjacent the rear end 11 of the holding portion. As seen in FIGS. 1 and 3, the protrusion 10 has a protrusion base 14 and side walls 17 and 18 parallel to the reference plane XY.

As seen in FIG. 1, the shank holding portion 8 is formed with two parallel threaded bores 22 and 23 which pass through the protrusion 10 so that their Y and Y' axes are disposed substantially in the reference plane and are normal to the longitudinal axis X' of the tool shank.

Figure 4:
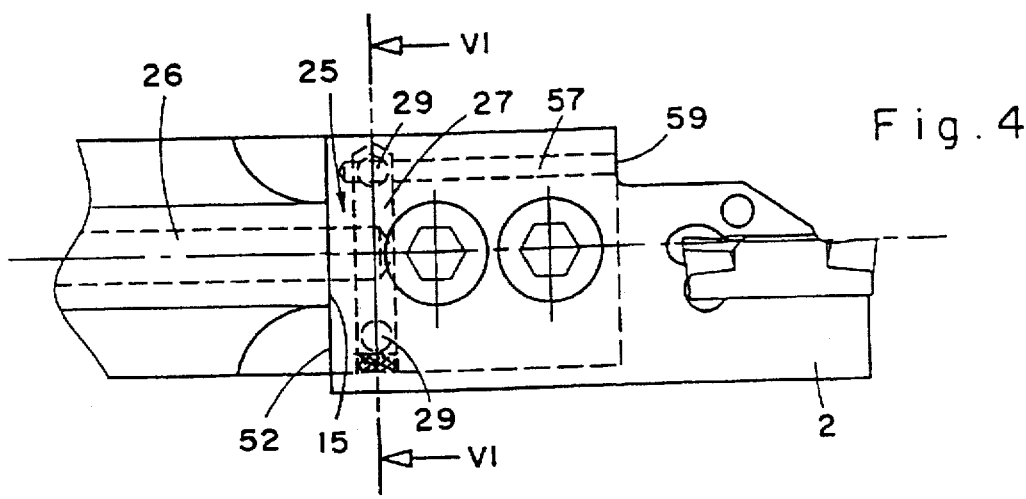
FIG. 4 is a side view of the cutting tool assembly shown in FIG. 2.
Figure 5:
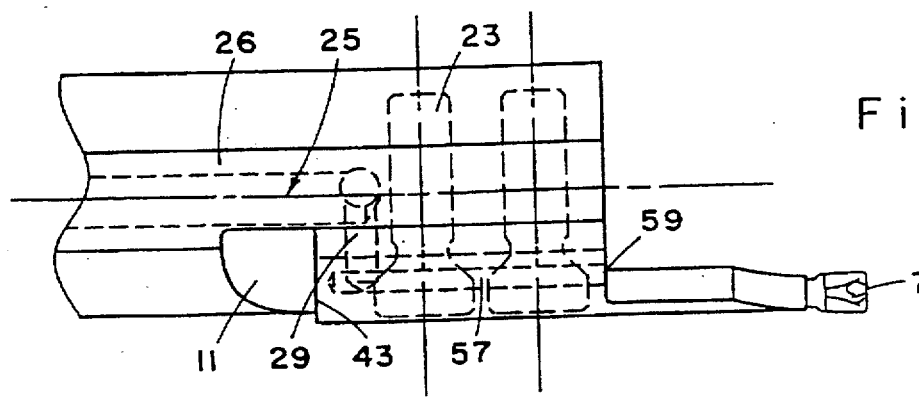
FIG. 5 is a plan view of the cutting tool assembly shown in FIG. 2.
Figure 6:
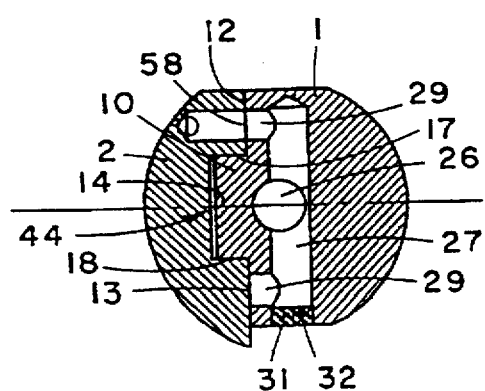
FIG. 6 is a cross-sectional view along the line VI—VI of the cutting tool assembly shown in FIG. 4.

As illustrated in FIGS. 4, 5 and 6, the tool shank 1 is formed with a coolant fluid duct arrangement 25 (shown with a dotted line) adapted to be in fluid communication with a coolant fluid supply means (not shown). The coolant fluid duct arrangement 25 comprises a coolant fluid axial bore 26 extending along the tool shank and terminating at a coolant fluid transverse bore 27 located in the shank holding portion 8 in a region between the rear end 11 thereof and the threaded bore 23. The transverse bore 27 has two outlet portions 29 located laterally and terminating at the abutment surfaces 12 and 13. The outlet portions 29 of the transverse bore 27 are operated alternatively depending on whether the tool shank 1 is used with a left-hand adaptor, as in the described embodiment, or with a right-hand one. As shown in FIG. 6, an end portion 31 of the coolant fluid transverse bore 27 is plugged with a plug 32.

As seen in FIGS. 1 and 2, the adapter 2 has an arcuate shape and is formed with an insert retaining blade portion 40 having an insert receiving slot 41 where the cutting insert 3 is held in a self-clamping manner and an adaptor mounting portion 42 to be screw clamped to the holding portion 8 of the tool shank 1. The adaptor mounting portion 42 extends from the insert retaining portion 40 to a terminal end 43 of the adaptor. A side surface of the adaptor mounting portion which is not seen in FIG. 1 and which cooperates with the shank holding portion 8 has a profile mating with that of the shank holding portion 8. Thus, as seen in FIG. 3, the adaptor mounting portion is formed with a central rectangular elongated recess 44 receiving the protrusion 10 and abutting surfaces 45 and 46 located on either side of the recess 44. Similarly to the protrusion 10 and the abutment surfaces 12 and 13 seen in FIG. 1, the recess 44 and the abutting surfaces 45 and 46 extend axially from the insert retaining blade portion 40 to the terminal end 43 of the adaptor mounting portion 42. Reverting to FIG. 3, the recess 44 has a recess base 48 and side walls 49 and 50 which are spaced by a distance which slightly exceeds a distance between the protrusion walls 17 and 16. In addition, the depth of the recess 44 exceeds the height of the protrusion 10. As seen in FIG. 4, the adaptor mounting portion 42 has an additional abutting surface 52 which bears against the additional abutment surface 15 of the shank holding portion 8.

As illustrated in FIG. 1, the adaptor mourning portion 42 is formed with two through bores 53 and 54 which pass through the recess 44. Axes A and A' of the through bores 53 and 54 are parallel to the axes of the threaded bores 22 and 23.

In the described embodiment, the through bores 53 and 54 as well as the threaded bores 22 and 23 are of a substantially identical shape which is seen in FIG. 8 illustrating identical cross-sectional views of the tool along the lines VIII—VIII and VIII'—VIII' in FIG. 7. As seen, each through bore 53, 54 has a countersunk portion 55 of a preferably asymmetric shape and has a clamping area 56 which is closer to a rim of the bore than the rest of the countersunk portion. The clamping areas 56 of the through bores 53 and 54 are located, in accordance with the locations of the axes of these bores, on different sides with respect to the reference plane XY.

As seen in FIGS. 4, 5 and 6, the adaptor mounting portion 42 is formed with an adaptor axial coolant fluid bore 57 extending between a fluid inlet orifice 58 (FIG. 6) disposed adjacent the adaptor terminal portion 43 and aligned with outlet portion 29 of the coolant fluid transverse bore 27, and a fluid outlet orifice 59 (shown also in FIG. 2) disposed adjacent and above the insert retaining portion 40 so as to direct coolant fluid to the vicinity of the cutting edge 7.

Reverting now to FIG. 1, each of the clamping screws 5, 6 has a clamping head 60 adapted to be freely received within the respective through bore 53, 54 of the adaptor mounting portion 42 and a screw threaded portion 61 to be screwed into the threaded bore 22, 23 of the shank holding portion 8. The clamping head 60 is formed with a conical clamping portion 63 having an included angle corresponding to that of the countersunk portion 55 of the through bore 53, 54.

With reference to FIGS. 7 to 10, the mode of coupling of the adaptor 2 with the tool shank 1 will now be described. When the adaptor mounting portion 42 is attached to the shank holding portion 8, the protrusion 10 is received within the recess 44 leaving a gap 65 (FIG. 8). As seen in FIG. 8, the through bores 53 and 54 are substantially aligned with the threaded screw bores 22 and 23, the arrangement, however, being such that the axes of the through bores 53 and 54 are slightly offset with respect to the axes of the respective threaded bores 22 and 23 both in the direction along the longitudinal axis of the tool shank and in the direction perpendicular to the reference plane. Thus, the axis of each through bore 53, 54 is closer to the insert retaining portion 40 than the axis of the respective threaded bore, the axis of the bore 53 which is disposed adjacent the insert retaining portion 40 being located slightly above the reference plane and the axis of the bore 54 which is disposed adjacent the terminal end 43 of the adaptor mounting portion 42 being located slightly below the reference plane.

With reference to FIGS. 9 and 10, upon the screw coupling of the clamping screws 5 and 6 in the in the threaded bores 22 and 23, in any sequence, the abutting surfaces 45 and 46 bear against the abutment surfaces 12 and 13 of the shank holding portion. Simultaneously, as shown in FIG. 8, the clamping portion 63 of the screw head 60 of each screw 5, 6 bears clampingly against the respective through bore countersunk portion 55 at its clamping area 56. Due to the specific mutual disposition of the aligned bores and of the clamping area 56 thereof, the engagement of the clamping portion 63 of each screw 5, 6 with the through bore countersunk portion 55 occurs at a predetermined location 70a, 70b thereof (FIG. 7). The predetermined locations 70a and 70b are disposed, on the one hand, at areas of the bores located on the side of the terminal end 43 of the adaptor, whereby it is ensured that the adaptor mounting portion is biased in the direction towards the abutment surface 15 of the shank holding portion, and on the other hand so that the location of contact 70a which is adjacent the insert retaining portion, is disposed below the reference plane, while the location of contact 70b which is adjacent the terminal end 43 of the adaptor is disposed above the reference plane. By virtue of such a disposition of the locations of contact between the clamping screws 5 and 6 and the through bores 53 and 54, it is achieved that the adaptor is slightly rotated on the lateral abutment surfaces 12 and 13, due to which the protrusion walls 17 and 18 engage the recess walls 49 and 50 at predetermined positions 80a and 80b which are located on different sides with respect to the reference plane. Thus, the contact area 80a which is adjacent the cutting edge 7 is located above the reference plane (FIG. 10) and the contact area 80b which is adjacent the terminal end 43 is located below the reference plane (FIG. 9). As a result, an equilibrium of clamping forces is achieved and a stable and rigid clamping of the adaptor to the tool shank is ensured.

Thus, the present invention provides for the clamping mechanism which is very simple and user friendly. Furthermore, the clamping mechanism allows for a relatively small number of components of the tool assembly and for a miniaturization thereof, for simple handling and relatively easy manufacturing, due to possible relatively large manufacturing tolerances, for accurate and repeatable positioning of the adaptor in the tool ensuring its reliable and rigid fixation.

In view of the fact that the tool shank in the described metal cutting tool assembly is of a cylindrical shape, it is particularly useful that all the elements of the assembly which are involved in the clamping procedure, i.e. the clamping screws, protrusion and recess, are disposed in the vicinity of the reference plane of the tool, which is especially advantageous for such tools having small diameters used, e.g. for machining of grooves, in particular deep and narrow grooves, within deep and narrow holes in workpieces.

Thus, FIG. 11 shows the above-described cutting tool during cutting operation. The arrows show directions of possible relative movement of the tool. The shadowed area illustrates schematically how the coolant fluid is supplied through the tool shank and the adaptor to the cutting area in the vicinity of the cutting edge. Thus, due to the above described construction of the cutting tool used, particularly, with the self-clamped insert having small volume of insert clamping means, an effective supply of the coolant fluid to the cutting area is provided and consequent cooling of the cutting insert and evacuation of chips from the cutting area is achieved, which is especially advantageous for machining of deep holes and/or grooves with small diameters.

It should be mentioned that the cutting tool assembly may be designed with features different from that described above and shown in the drawings. Thus, though the cutting tool shown in the drawings is a left-hand tool, the same tool shank may be used for right-hand tools. The tool shank may have rectangular cross-sectional shape, as shown in FIG. 12, rather than being cylindrical. The adaptor and, in particular, its insert retaining blade portion may be flat rather than being arcuate.

The protrusion may be formed in the adaptor mounting portion and the recess—in the tool shank holding portion. The abutting and abutment surfaces of the adaptor mounting portion and the shank holding portion may be constituted by the base surfaces of the recess and protrusion rather than by lateral surfaces of the adaptor mounting portion and the tool shank holding portion. The walls of the recess and the protrusion may be not flat and not parallel to the reference plane and to each other. The protrusion and the recess may fit tightly when produced with small tolerances, in which case only one clamping screw and, consequently, only one pair of aligned bores need to be used, the adaptor through bore and the threaded bore of the shank holding portion being both disposed substantially in the reference plane.

The aligned bores and, consequently, the clamping screws may be slanted, in particular in different senses, with respect to the longitudinal axis of the tool shank as well as with respect to said reference plane. The screws may be of different diameter. The features employed in order to achieve the predetermined position of the clamping portions of the through bores during the clamping procedure, i.e. the clamping area of the counter-sunk portion of the through bores and the off-set relationship between the axes of the aligned bores, can be used alternatively rather than in combination and may be designed in any other suitable form. For example, there may be used, for the above purpose, eccentric locking cam arrangements. The axes of the through bores may be on the same side of the reference plane rather than being on different sides thereof.

The adaptor coolant fluid bore may extend longitudinally throughout the adaptor and have the fluid outlet orifice in the insert retaining portion.

We claim:

1. A cutting tool assembly comprising an elongated tool shank having, at a side adjacent a leading end thereof, a shank holding portion and an exchangeable adaptor having an insert retaining portion for retaining a replaceable cutting insert and an adaptor mounting portion releasably secured to the shank holding portion by at least two clamping screws, the tool assembly having a reference plane passing through a cutting edge of the insert and through an axis of relative rotation of a workpiece with respect to the tool, during operation of the tool;

one of the adaptor mounting and shank holding portions being formed with a recess and the other one being formed with a protrusion mating with the recess and received therein;

said adaptor mounting portion being formed with at least two adaptor through bores and said shank holding portion being formed with at least two threaded bores substantially aligned with the respective adaptor through bores, the threaded and through bores being oriented transversely to said axis of rotation and passing through the recess and the protrusion, the axes of the through bores being slightly offset with respect to the axes of the respective threaded bores and being disposed closer to the insert retaining portion than the axes of the threaded bores, each clamping screw being inserted into the respective adaptor through bore and threaded bore of the shank holding portion and having a screw head portion received within said through bore and a screw threaded portion screwed into said threaded bore; the axes of said threaded bores being located substantially in said reference plane.

2. A cutting assembly according to claim 1, wherein the tool assembly comprises only two clamping screws.

3. A cutting tool assembly according to claim 2, wherein the axis of the through bore which is located adjacent the insert retaining portion is disposed slightly above said reference plane, as seen in the direction of a side view of the tool.

4. A cutting tool assembly according to claim 3, wherein the axis of the through bore which is located adjacent a terminal end of the adaptor is disposed slightly below said reference plane, as seen in the direction of the side view of the tool.

5. A cutting tool assembly according to claim 2, wherein the axes of the threaded and through bores are substantially normal to said axis of relative rotation of the workpiece with respect to the tool.

6. A cutting tool assembly according to claim 1, wherein the protrusion and the recess have side walls substantially parallel to the reference plane of the tool.

7. A cutting tool assembly according to claim 6, wherein said side walls of the recess are spaced by a distance greater than a dimension of the protrusion between the corresponding side walls thereof.

8. A cutting assembly according to claim 1, wherein the tool shank is of an elongated cylindrical shape having a longitudinal axis substantially lying in said reference plane, the axes of the threaded bores being oriented radially with respect to said longitudinal axis.

9. A cutting tool assembly according to claim 8, wherein the adaptor of the tool has a transverse dimension not exceeding a diametric dimension of the cylindrical tool shank.

10. A cutting tool assembly according to claim 9, which assembly is adapted for internal machining within a relatively narrow hole in a workpiece, said dimension of the tool shank being less than a cross-sectional dimension of said relatively narrow hole.

11. A cutting assembly according to claim 8, wherein the adaptor is of a substantially arcuate shape.

12. A cutting tool assembly according to claim 1, wherein the adaptor mounting portion is formed with an adaptor coolant fluid bore extending substantially along the length of the adaptor between a fluid inlet orifice disposed adjacent an adaptor terminal portion and adapted to be in fluid communication with a coolant fluid supply means, and a fluid outlet orifice disposed at a leading end of the adaptor mounting portion above the insert retaining portion.

13. A cutting tool assembly according to claim 12, wherein the fluid inlet orifice of the adaptor is connected to a coolant fluid duct arrangement in the tool shank, adapted to be in fluid communication with a coolant fluid supply means, the coolant fluid duct arrangement of the tool shank comprising of a coolant fluid axial bore extending along the tool shank and terminating at a coolant fluid transverse bore located in said tool shank holding portion in a region thereof between said rear end of the holding portion and said at least one threaded bore, the coolant fluid transverse bore having at least one outlet portion which is aligned with said fluid inlet orifice of the adaptor.

* * * * *